ical No.: 173,081
United States Patent [19]
Burger et al.

[11] 3,734,268
[45] May 22, 1973

[54] LID ORIENTING ASSEMBLY
[75] Inventors: Philip M. Burger, Lawrence; David E. Carson, Wichita, both of Kans.
[73] Assignee: Carson & Burger, Incorporated, Lawrence, Kans.
[22] Filed: Aug. 19, 1971
[21] Appl. No.: 173,081

Related U.S. Application Data
[63] and a continuation-in-part of Ser. No. 39,847, May 22, 1970, abandoned.

[52] U.S. Cl. ..............................198/33 AD, 214/1 Q
[51] Int. Cl. ................................................B65g 7/00
[58] Field of Search ..........................214/1 Q, 8.5 E; 198/33 AD, 33 AC, 33 AA; 193/43 R, 43 B, 43 C

[56] References Cited
UNITED STATES PATENTS
3,306,425  2/1967  Rapp, Jr. et al...................198/33 AD
3,599,829  8/1971  Aidlin..............................198/33 R X Primary Examiner—Gerald M. Forlenza
Assistant Examiner—Frank E. Werner
Attorney—Schmidt, Johnson, Hovey & Williams

[57] ABSTRACT

An assembly for use in connection with machines for manufacturing, conveying, stacking, and packaging lid-like articles having a top portion and a peripheral skirt defining a hollow therewithin, the assembly orienting the articles so that, as they move to a point of delivery they are all in a skirt-up position. The assembly presents a first station having an upstanding wall which shifts the articles laterally toward a second station which has an air nozzle directing a stream of air upwardly to flip only the skirt-down articles over into a skirt-up position on the conveyor for movement to a point of delivery. A guide at the second station cooperates with the first wall and the conveyor to position the articles in the desired overlying relationship to the air nozzle so that only the skirt-down articles are flipped.

9 Claims, 4 Drawing Figures

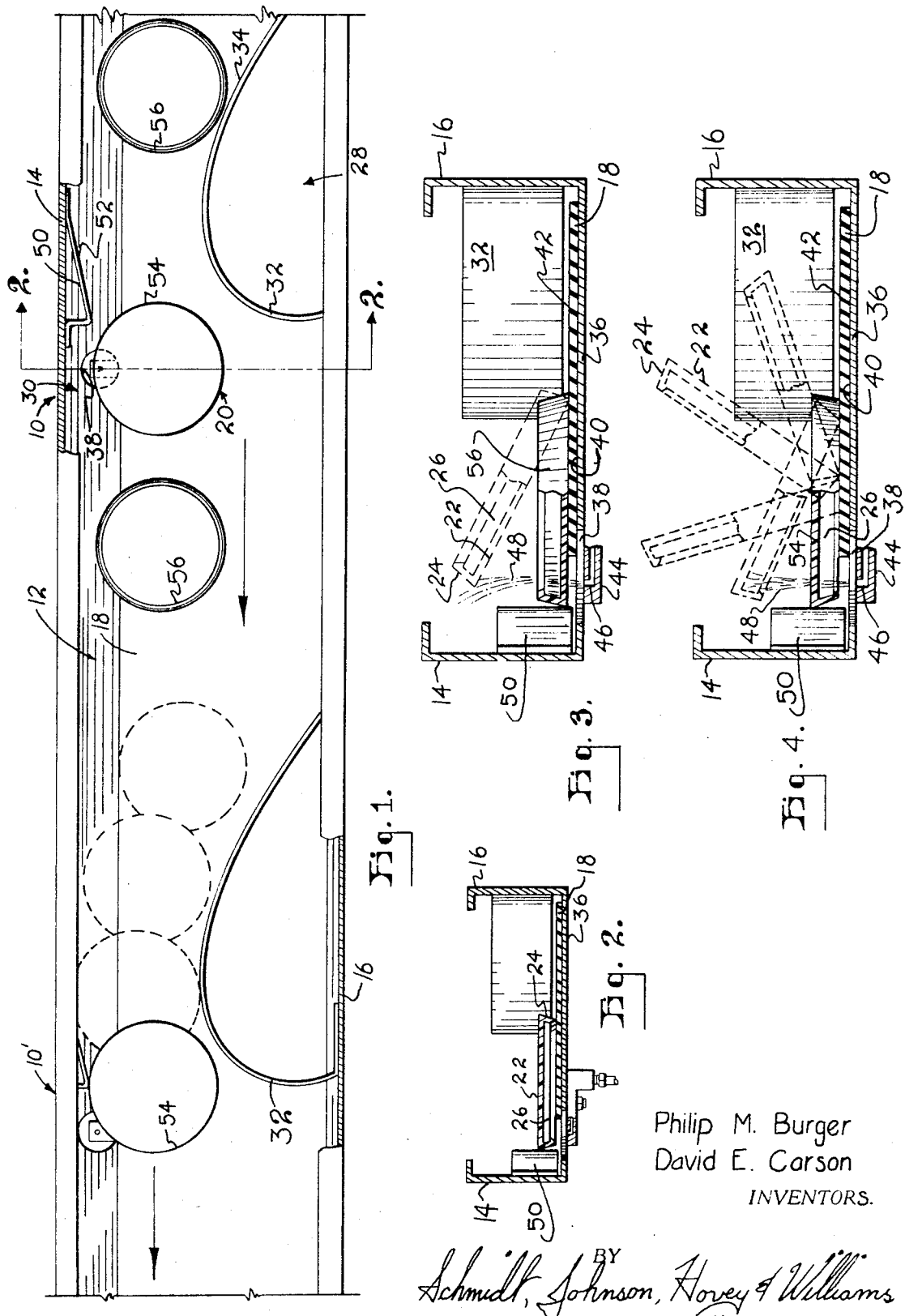

LID ORIENTING ASSEMBLY

CROSS REFERENCES

This application is a continuation-in-part of our application Ser. No. 39,847, filed May 22, 1970, and entitled "Lid Orienting Assembly", now abandoned.

This invention relates to an orienting assembly for use in conjunction with a belt conveyor, the assembly serving to properly orient lid-like articles which have a top portion and a peripheral skirt defining a hollow therewithin.

While the assembly may be utilized in conjunction with any such article, it is particularly intended for use in conjunction with plastic overcaps that snap over the tops of container such as coffee cans or the like to serve as reclosure devices for such containers after they have been opened. Such overcaps are in wide use and are produced in large quantities by plastic molding methods. However, in the handling of such overcaps or similar lid-like articles, it is desirable for the fabricator thereof to package the articles in consistent stacked relationship for delivery to the ultimate user.

Accordingly, it is the primary object of this invention to provide an assembly for commonly orienting 11d-like articles as they move along a belt conveyor in different sets, the articles of one set being oriented in a skirt-up position while the articles of the other set are oriented in skirt-down positions, the end result being that, when said articles reach the point of delivery for stacking or further handling they are all oriented in the same skirt-up position.

It is another object of this invention to provide a lid orientating assembly which has laterally spaced, first and second stations, the first station having an upstanding wall for directing the articles laterally toward the second station. The second station has an air nozzle adapted to direct a stream of air upwardly against the articles and into the hollow of the skirt-down articles whereby to flip the latter over into a skirt-up position, the articles then continuing movement along the conveyor to a point of delivery. A guide at the second station cooperates with the wall to position all of the articles with a predetermined portion thereof overlying the nozzle so that the airstream is capable of flipping only the skirt-down articles.

Other objects of the invention will become apparent from the following specification and accompanying drawing, wherein:

FIG. 1 is a fragmentary plan view illustrating a pair of assemblies constructed in accordance with the present invention in position adjacent a conveyor belt;

FIG. 2 is a fragmentary, sectional view taken along line 2—2 of FIG. 1;

FIG. 3 is an enlarged, fragmentary sectional view similar to FIG. 2 but showing the manner in which a skirt-up article moves by the second station without being flipped; and FIG. 4 is an enlarged, fragmentary sectional view similar to FIG. 3 but showing the manner in which a skirt-down article is flipped at the second station.

The assembly, broadly designated by the numeral 10, is intended for use in conjunction with conventional conveying apparatus 12 disposed between parallel, vertical sidewalls 14 and 16, which conveying apparatus includes a conveyor belt 18. FIG. 1 also illustrates a second lid orienting assembly 10' identical in structure and operation to assembly 10 and spaced downstream therefrom. The second assembly 10' is a fail-safe assembly which acts simply to orient those lids not flipped by the first assembly 10. As they are identical, only one lid orienting assembly 10 will be hereinafter described in detail.

The conveying apparatus 12 is used to move lid-lke articles 20, whose major dimension is substantially less than the lateral width of the conveying apparatus, from their point of manufacture to a point of delivery at the end of belt 18 where such articles are normally stacked for subsequent packaging and movement to a point of use. It is important that when such articles reach their point of use in stacked relationship, they will be in exactly the same relationship, that is, all of the articles in a given stack should have the skirt thereof facing in the same direction.

Since, in the embodiment of the invention illustrated, the articles 20 come from the molding machines in random positions, that is some having their skirts up and some having their skirts down, it is necessary that they be oriented as they move from the molding machine to the point of delivery. Accordingly, the assembly 10 is interposed along conveyor belt 18 whereby to orient the articles 20 all in a skirt-up position prior to their reaching the point of delivery. It is to be understood that upstream from assembly 10, suitable guide means may be provided whereby the articles 20 are aligned in spaced, single-file relationship along the belt 18. The articles 20 in the embodiment illustrated are in the nature of plastic over-caps and each presents a top portion 22 normally circular in plan configuration and having a major diameter substantially less than the width of conveying apparatus 12. Each article also has a circumscribing skirt 24 depending vertically therefrom, the skirt defining a hollow 26 within the article.

To properly orient the articles, the assembly 10 presents a first station 28 and a second station 30, the first station 28 being upstream from the second station 30 relative to the articles as they move along belt 18. First station 28 includes a curved, ustanding wall 32 extending from sidewall 16 toward sidewall 14. Wall 32 thereby presents an angularly disposed surface 34 for contacting the articles 20 and shifting them laterally toward sidewall 14 as they move along belt 18. Wall 32 thereby shifts all articles 20 toward the second station 30 disposed adjacent the other sidewall 14. Wall 32 may, of course, be sized and positioned as desired to effect the necessary amount of lateral shifting of the articles 20.

Second station 30 may be fabricated as a single unit and includes a generally horizontal shelf 36 having an opening 38 therethrough. Shelf 36 is illustrated as supporting the entire undersurface of conveyor belt 18; however, shelf 36 may be segmented or formed in other desired configurations. The shelf 36 has an upper surface 40 substantially coplanar with the upper surface 42 of belt 18, the opening 38 being adjacent the edge of belt 18. The shelf 36, because of its substantially coplanar relationship with belt 18, effectively forms a stationary continuation of the belt adjacent the side thereof.

Second station 30 also includes a housing 44 secured upon the underside of shelf 36, which housing presents an air nozzle 46 for directing a stream of air 48 through opening 38 for purposes which will hereinafter be more fully described. A second vertically upstanding guide 50 at the second station 30 presents a lateral protuberance for contacting articles 20 just prior to their passing over opening 38. Guide 50 presents an angularly disposed guide surface 52 for shifting laterally toward sidewall 16 those articles which have been shifted laterally too far toward the opposite sidewall 14.

In operation, articles will be conveyed to first station 28 in different sets disoriented with respect to one another. Specifically, articles denoted by the numeral 54 and presented in skirt-down positions, comprise a skirt-down set of articles, while articles denoted by the numeral 56 and presented in skirt-up positions, comprise a skirt-up set of articles. The guide wall 32 at the first station 28 contacts all of the articles 54 and 56 to shift the same laterally toward the second station 30. The guide 50 at the second station 30 cooperates with guide wall 32 in directing each article to move toward opening 38 with a predetermined portion of the article in overlying relationship with continuously flowing airstream 48. The airstream 48 is adjusted in intensity so as to act upon this predetermined overlying portion of the articles to effect flipping of only the articles 54 of the skirt-down set.

As shown in FIG. 4, the airstream 48 is directed into the hollow 26 of the skirt-down article 54 to act against the inner surfaces of both the top portion 22 and skirt 24 to flip the skirt-down article 54 over into a skirt-up position, Airstream 48 contacts an outer portion of the skirt-down article 54 to induce a flipping action thereto. It is important to note in this respect that the skirt-down articles 54 not be positioned with too great a portion thereof in overlying relationship to airstream 48 as, in such instance, the airstream wil induce only a lifting action upon skirt-down article 54 and not induce sufficient flipping action thereto. On the other hand, the skirt-down articles must be positioned with sufficient area exposed to airstream 48 so that the latter can exert sufficient force upon the skirt-down articles to cause flipping thereof. Accordingly, wall 32 and guide 50 cooperate to position the articles with only a certain portion thereof predetermined with respect to the intensity of airstream 48, overlying opening 38 in order to assure flipping of only the skirt-down articles 54.

The wall 32 and guide 50 position the same predetermined portion of the skirt-up articles 56 over airstream 48 upon their movement over opening 38. Airstream 48, however, acts effectively upon a lesser area of the skirt-up articles than the skirt-down articles. The airstream accordingly may exert a slight lifting action upon skirt-up articles 56 as illustrated in FIG. 3; however, the airstream will not exert sufficient force upon the skirt-up articles to flip the latter. Accordingly, as the articles of both the skirt-up and skirt-down sets pass over airstream 48, only the skirt-down articles 54 will be flipped, while the skirt-up articles 56 will remain in their original positions and orientation of the different sets of articles is thereby effected. The assembly 10 may be utilized alone or in combination with a second, identical assembly 10' as mentioned before, the second assembly 10' simply providing a fail-safe system for positively assuring orientation of all of the lids in a skirt-up position.

It is apparent that assembly 10 may be utilized to handle and orient many different types of articles, the over-caps or lid-type plastic articles being chosen only for purposes of illustration herein. The assembly 10 is easily incorporated into existing conveyor assemblies and has been found to provide reliable orientation of lid-like articles.

Having thus described the invention, what is claimed as new and desired to be secured by Letters Patent is:

1. An assembly for orienting lid-like articles which have a top portion and a peripheral skirt defining a hollow therewithin, comprising:
   a conveyor for moving different sets of said articles in a single file toward a first station, said different sets of articles being oriented in skirt-up and skirt-down positions respectively;
   means at said first station for shifting at least one set of said articles toward a second station; and
   means at said second station for directing a stream of air against said articles of said one set and thereby flipping said articles of said one set to effect orientation of said different sets of articles in the same position for movement to a point of delivery.

2. An assembly as set forth in claim 1, said conveyor having a lateral width greater than the major dimension of said articles.

3. An assembly as set forth in claim 2, said first and second stations being laterally spaced apart, said means at the first station and the conveyor, cooperating to shift articles of at least said one set laterally toward said second station.

4. An assembly as set forth in claim 3, wherein said means at said first station shifts all said articles of said different sets toward said second station, said means at said second station being operable to flip only the skirt-down articles to a skirt-up position to effect orientation of all said articles in a skirt-up position.

5. An assembly as set forth in claim 4, the means at said second station directing a stream of air upwardly into the hollow of the skirt-down article when the latter is moved into overlying relationship thereto at the second station, whereby to flip said skirt-down article.

6. An assembly as set forth in claim 5, said means at the first station including an upstanding wall adjacent said conveyor for guiding said skirt-up and skirt-down articles into a position with at least portions thereof overlying the air directing means at the second station.

7. An assembly as set forth in claim 6, there being a guide adjacent said conveyor at said second station for cooperating with the upstanding wall in guiding said skirt-up and skirt-down articles into a position with predetermined portions thereof overlying the air directing means, whereby to flip only said skirt-down articles.

8. An assembly for orienting lid-like articles which have a top portion and a peripheral skirt defining a hollow therewithin, comprising:
   a conveyor for moving different sets of said articles in a single file toward a first station, said different sets of articles being oriented in skirt-up and skirt-down positions respectively, said conveyor having a lateral width greater than the major dimension of said articles;
   means at said first station for shifting said articles toward a second station;
   means at said second station for flipping articles of one of said sets to effect orientation of said different sets of articles in the same position for movement to a point of delivery, said means at the second station including a nozzle capable of directing a stream of air against said articles, said first and second stations being laterally spaced apart, said means at the first station and the conveyor cooperating to shift said articles toward said second station, said means at said second station being operable to flip only the skirt-down articles to a skirt-up position, the nozzle at said second station directing a stream of air upwardly into the hollow of the skirt-down article when the latter is moved into overlying relationship to said nozzle at said second station, the means at the first station including an upstanding wall adjacent said conveyor for guiding said skirt-up and skirt-down articles into a position with at least portions thereof overlying the nozzle at said second station;

a guide adjacent said conveyor at said second station for cooperating with the upstanding wall in guiding said skirt-up and skirt-down articles into position with predetermined portions thereof overlying the nozzle; and a generally horizontal shelf adjacent said conveyor at said second station, the upper surface of such shelf being substantially co-planar with the upper surface of the conveyor belt.

9. An assembly as set forth in claim 8, the nozzle at the second station being positioned below the upper surface of the shelf, the shelf supporting the articles in overlying relationship to said nozzle, there being an opening through said shelf whereby the stream of air from said nozzle may be directed upwardly through said opening and into the hollow of the skirt-down articles to thereby flip the skirt-down articles.

* * * * *